Dec. 27, 1949  F. SCHULZ  2,492,819
FISHING REEL

Filed Jan. 7, 1948  3 Sheets-Sheet 1

INVENTOR.
FRANK SCHULZ
BY Frederick Freitenfeld
ATTORNEY

Dec. 27, 1949   F. SCHULZ   2,492,819
FISHING REEL

Filed Jan. 7, 1948   3 Sheets-Sheet 2

INVENTOR.
FRANK SCHULZ
BY Frederick Breitenfeld
ATTORNEY

Dec. 27, 1949 F. SCHULZ 2,492,819
FISHING REEL
Filed Jan. 7, 1948 3 Sheets-Sheet 3
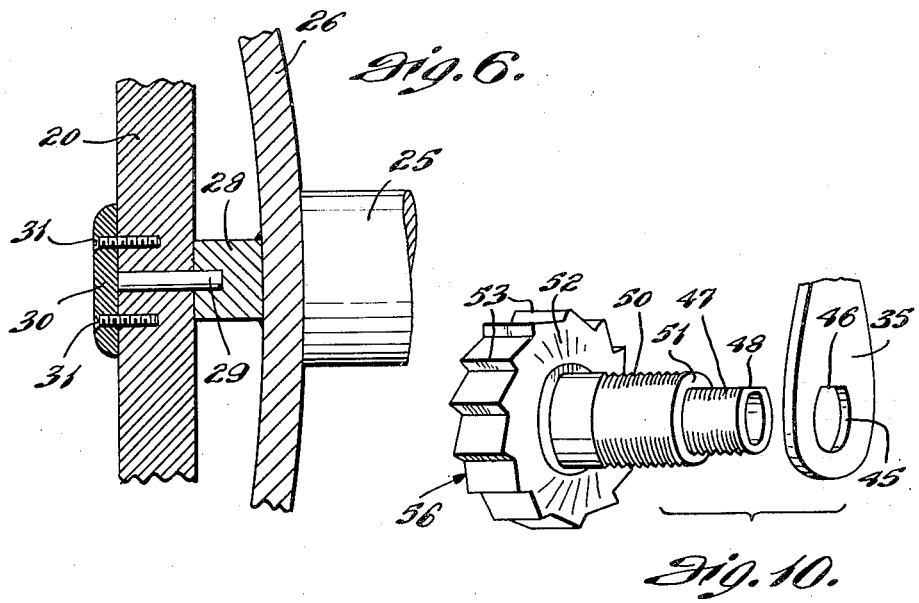
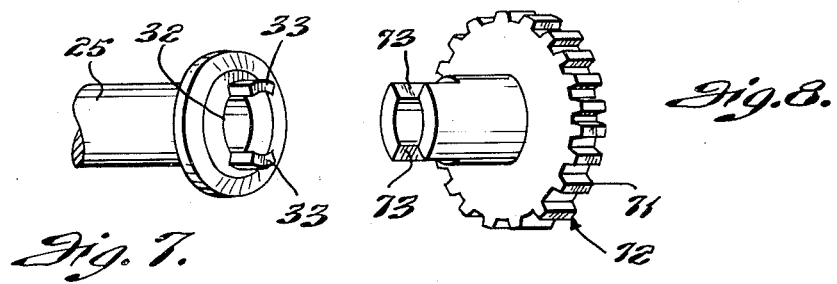
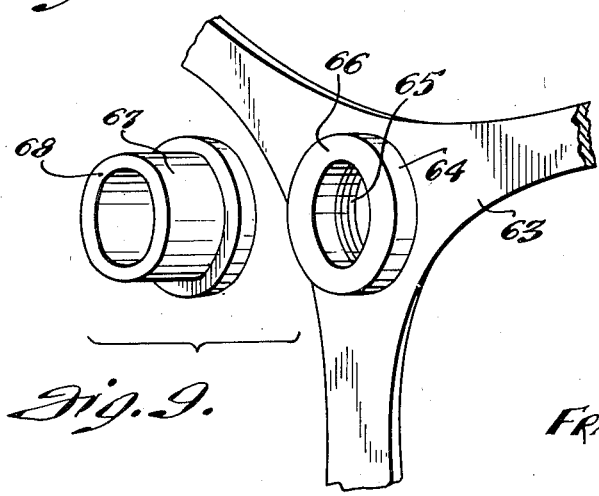
INVENTOR.
FRANK SCHULZ
BY Frederick Breitenfeld
ATTORNEY Patented Dec. 27, 1949

2,492,819

UNITED STATES PATENT OFFICE 2,492,819

FISHING REEL

Frank Schulz, Brooklyn, N. Y.

Application January 7, 1948, Serial No. 934

7 Claims. (Cl. 242—84.7)

My present invention relates generally to reeling devices, and has particular reference to fishing reels.

The principal object of the invention is to provide a fishing reel in which the mechanism is more efficiently shielded against impairment of operation by the entry of sand or other matter.

A fishing reel of modern type comprises a spool, a holder which includes a pair of spaced parallel disks between which the spool is journaled, a crank handle, and transmission mechanism between the handle and spool. The mechanism generally includes a chain of gears, a ratchet, a clutch for engaging and disengaging the spool, and usually a second clutch or so-called "star drag" of adjustable frictional character to allow for slippage when a fish is pulling on the line. For reliable smooth operation, these movable and cooperating parts must be maintained in clean well-lubricated condition.

I have found that one of the main shortcomings of such reels, as heretofore designed, arises from the fact that at least some of the essential parts of the mechanism are usually mounted on the spool side of one of the holding disks, whereby the entry of sand and other foreign matter is almost unavoidable, with consequent impairment of operation. One of the features of the present invention resides in so designing the parts that the mechanism is not only located in its entirety on the outside of one of said disks, but is housed and enclosed in an unusually efficient manner to protect it thoroughly from undesirable contamination.

Furthermore, such protective housings as have been heretofore suggested are often deficient because of the provision of at least one opening for the passage of clutch-controlling and other parts. It is common knowledge that sand and other contaminating matter will sooner or later find its way into the mechanism even through small openings of this kind. In my present improved construction, there are no openings at all, and the continued smoothly-operating interplay of the several parts is thus assured over long periods of use.

Other important features of the invention lie in an arrangement of parts which permits these advantages to be achieved without sacrifice of the refined adjustments which fishermen are accustomed to find, and to desire, in fine quality reels; in a design which permits a more compact assembly of elements and results in a reel whose over-all dimensions are less than those of ordinary reels of comparable character; in innovations which not only simplify the mode of operation and control, but which impart a more desirable gear ratio between crank and spool; and, in general, in a structure which is economically-manufacturable, of workmanlike character, and of attractive appearance.

I achieve these general objects and advantages, and such other objects and advantages as may hereinfter appear or be pointed out, in the manner illustratively exemplified in the accompanying drawings, in which:

Figure 6 is an enlarged fragmentary cross-section of the left-hand end of the reel as viewed in Figure 1;

Figure 7 is a fragmentary perspective view of the clutch end of the spool spindle;

Figure 8 is a perspective view of the corresponding clutch element of the reel mechanism;

Figure 9 is an exploded view of certain cooperating parts of the so-called "star drag" clutch; and Figure 10 is an exploded view of the handle and ratchet elements.

Figures 1, 2:
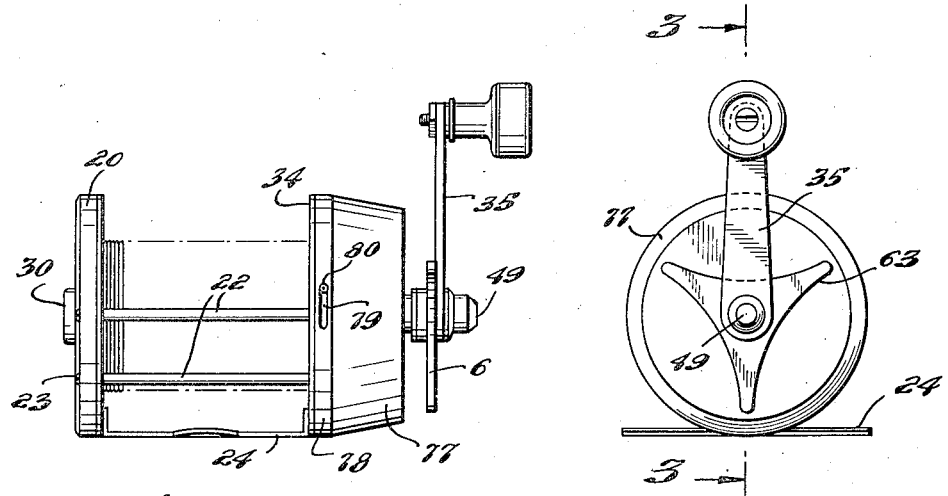
Figure 1 is an elevational view of a fishing reel constructed in accordance with the present invention.
Figure 2 is an end view thereof.

The spool holder consists of the two spaced parallel disks 20 and 21 (see Figures 1 and 3) maintained in proper relationship at all times by the usual longitudinal rods 22 extending between them and secured by means of screws 23 or the like. Also extending between the disks 20, 21 is the element 24 by means of which the reel may be removably secured to a fishing rod, in usual fashion.

The spool that is journaled between the disks 20 and 21 has the usual core 25 (Figure 6), and opposite end walls 26 and 27. These walls are slightly convexed outwardly, as shown. At the left-hand end of the reel, as viewed in Figure 1, the spool is provided with a hub 28 which fits loosely over a pin 29 carried by the disk 20. This pin may be held in position by forming it as part of an element which has the head 30 permanently secured to the disk 20 by means of screws 31 (see Figure 6).

Figure 3:
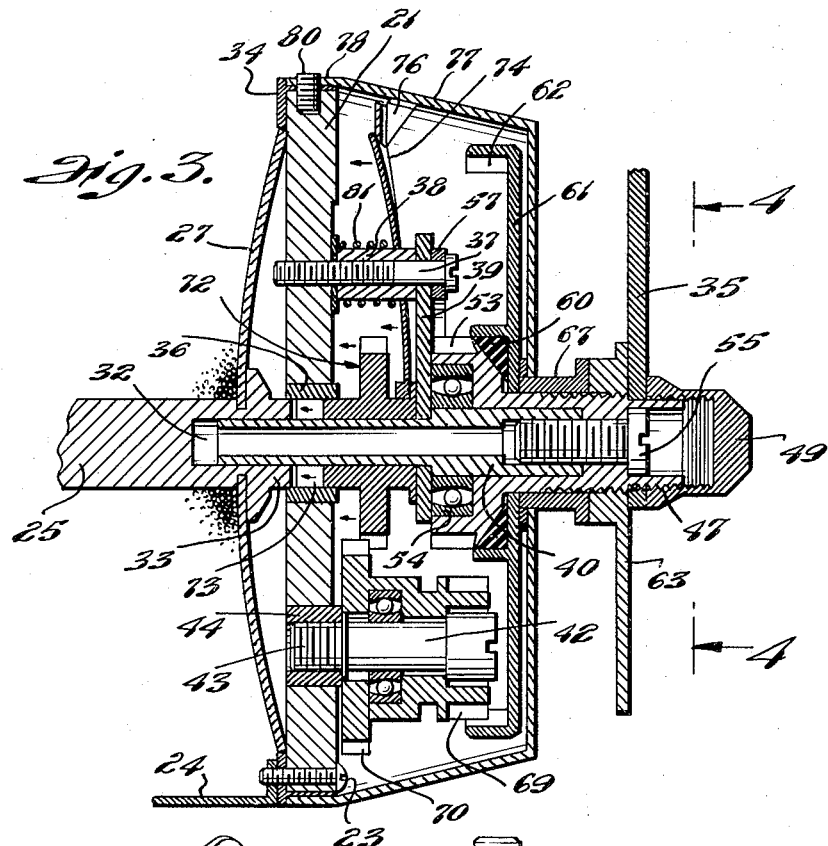
Figure 3 is an enlarged cross-sectional view taken substantially along the line 3—3 of Figure 2.

At the right-hand end of the reel, as viewed in Figure 1, the hub 25 of the spool terminates in a part which has the axial bore 32, and which is provided with diametrically-spaced projections or lugs 33 (Figure 7). The spool end 27 is permanently secured to the hub 25 directly behind this clutch portion, as indicated in Figure 3. The wall 27 has been omitted from Figure 7.

On each of the disks 20 and 21 there is a marginal overhang on the spool side, and the edge of the corresponding end wall of the spool accommodates itself within the confines of this overhang. In the illustrated construction, the body of each disk 20, 21 is composed of Bakelite or the like, and this overhang is formed by a metal rim 34 secured to it (see Figure 3).

The crank handle by means of which the movements of the spool are controlled is designated by the reference numeral 35. Operatively interposed between this handle and the spool is a driving mechanism of the kind hereinbefore referred to. In accordance with the present invention, this entire mechanism is mounted on the outer side of the disk 21, i. e., the side which is remote from the spool. To support this mechanism, several parts which will now be described are rigidly carried by the disk 21.

Figure 4:
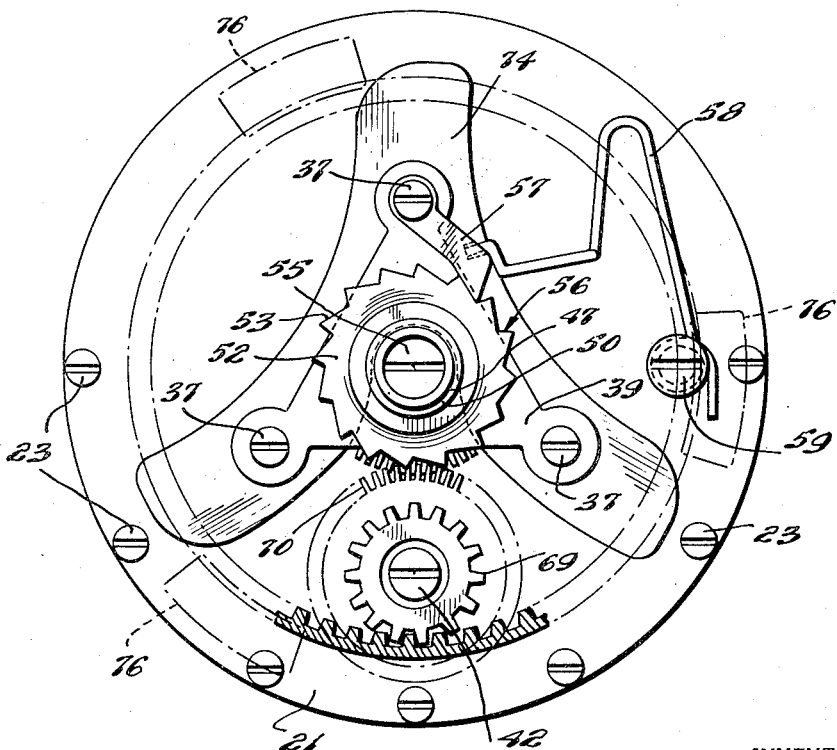
Figure 4 is a view in the direction 4—4 of Figure 3, with the protective housing and other parts removed, and with certain parts shown in cross-section and by dot-and-dash lines, to reveal the enclosed mechanism.

It should be pointed out, first, that the disk 21 is provided with a circular central aperture, aligned with the spool axis, and preferably provided with a lining or bearing member 36. Carried by the disk are a series of posts 37 (see Figure 4). These posts are preferably three in number, arranged in symmetrical relation. As shown most clearly in Figure 3, each post may be in screw-threaded engagement with the disk 21 and is surrounded by a sleeve 38. Supported on these posts is a substantially triangular plate 39 having a central opening. Permanently secured to the plate 39 is an axial tubular shaft 40 whose inner end projects through the central aperture in the disk 21 and into the bore 32 of the spool axle. The shaft 40 is of lesser diameter than the aperture in the disk 21, so that an annular space is provided into which the clutch elements 33 of the spool axle may extend.

From this description, it will be noted that the shaft 40 does not rotate, and is fixedly held in position by the plate 39 which is, in turn, fixedly carried by the disk 21.

Also fixedly carried by the disk 21 is a pin 42 which may be of any suitable construction (see Figure 3). I have shown it in the form of a single element of circular cross-section having a threaded end 43 engaging within a corresponding threaded sleeve 44 mounted within the disk 21.

The operative and movable parts of the present mechanism are supported on these several fixed elements. Starting at the handle end, it should be observed (Figure 10) that the handle is provided with an aperture 45 having a flattened edge 46. This permits the handle to fit non-rotatably over the rear end 47 of the sleeve-like element 56 shown. The part 47 is exteriorly threaded and has a flattened surface 48 corresponding to the edge 46. An internally-threaded cap 49 engages with the threads on the part 47 (see Figure 3) after the handle 35 has been applied. This secures the handle to the part 47, so that rotative movements of the handle will at all times cause corresponding rotative movements of the element 56.

Forwardly of the part 47, this element is provided with the slightly enlarged part 50 whose rear portion is externally threaded. This provides the shoulder 51 against which the handle 35 abuts. The purpose of the threads on the part 50 is to support the "star drag" element which will be described hereinafter.

Forwardly of the part 50, the element 56 is provided with the conical wall portion 52, and with the peripheral ratchet teeth 53.

The free rotation of this element on the fixed shaft 40 may be facilitated by the introduction of a ball bearing 54, as shown in Figure 3. The element 56 is held in position by a screw 55 which engages with internal threads formed in the end of the shaft 40. The screw 55 has a head which bears against an internal shoulder formed in the element 56.

Engaging with the ratchet teeth 53 is a pawl 57 pivotally supported on one of the pins 37. The pawl is yieldably pressed against the ratchet teeth by a suitable spring such as that shown at 58 in Figure 4. One end of this spring engages with the pawl 57, the other is secured to the disk 21 as at 59.

The rotation of the element 56 is transmitted to the balance of the mechanism by frictional contact of the conical wall 52 with a cooperating conically-shaped element 60 which is carried by the ring gear 61. The latter gear has the internal teeth 62 at its periphery, and it is mounted for free rotation upon the unthreaded part of the element 56, as shown most clearly in Figures 3 and 5.

The degree of friction between the surfaces 52 and 60 may be varied by the "star drag" control. This consists of an element 63 with radial fingers adapted to be engaged by the user. On this element there is a hub portion 64 whose rear end is internally threaded as at 65. These threads engage with the threads on the part 50 of the element 56, and are of such suitable pitch that slight rotations of the element 63 will cause corresponding advancement of this element toward and away from the reel as a whole. The forward face 66 of the hub 64 presses against the rear face of a sleeve 67 loosely mounted upon the part 50. The forward face 68 of the sleeve 67 presses against the axial part of the ring gear 61. Accordingly, a slight rotative adjustment of the element 63 will cause the ring gear 61 to press with desired degrees of force against the conical driving surface 52.

Rotatably mounted on the pin 42 is a unit consisting of the spur gears 69 and 70. The gear 69 is the smaller of the two, and its teeth are in constant engagement with the teeth 62 of the ring gear. The teeth of the gear 70 are in constant engagement with the teeth 71 of the clutch element 72 shown most clearly in Figure 8. This element has an axial bore which permits it to fit slidably yet rotatably upon the shaft 40. At its forward end, this element is provided with diametrically opposed recesses 73 adapted to engage with the projections 33 whenever the recesses 73 and the projections 33 are in alignment. When such engagement is effected, by shifting the element 72 along the shaft 40, the rotative movement of the handle 35 will be transmitted through the gears 61, 69, 70 and 72 to the spool axle 25, thereby causing the latter to rotate. When the projections 33 are disengaged from the recesses 73, by retraction of the clutch element 72, the spool is freed to rotate at will.

Figure 5:
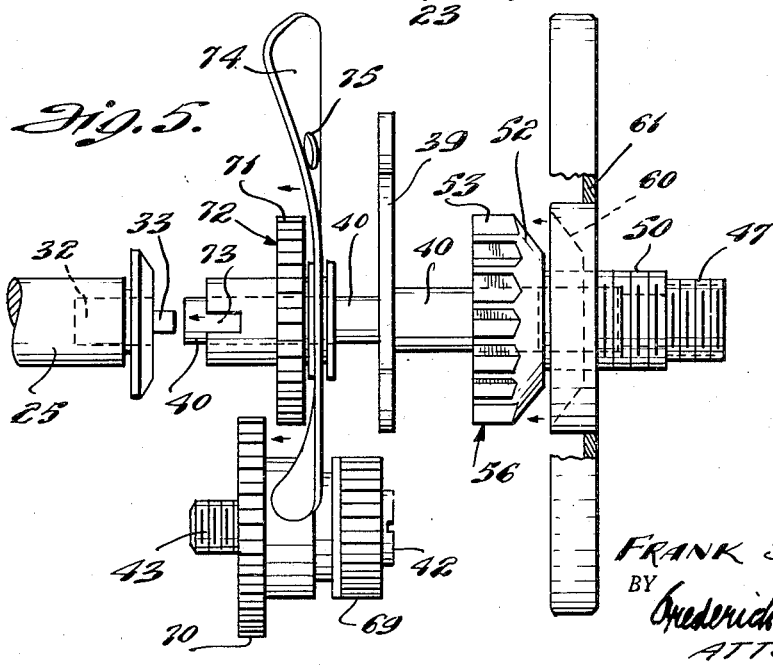
Figure 5 is an exploded view of certain of the parts.

During the shifting movements of the clutch element 72, to engage and disengage the spool, the gear teeth 71 remain in constant engagement with the teeth on the gear 70, as shown in Figure 3. (For clarity of illustration, Figure 5 shows the gear teeth 70 and 71 in separated relation.)

In accordance with my invention, the clutch control, i. e., the means for causing shifting movements of the clutch element 72, is in the form of a housing which is supported on the disk 21 and which completely encloses the entire mechanism.

The clutch control consists in the odd-shaped plate 74 which engages with the clutch element 72 but does not rotate with the latter. The plate 74 which I have chosen to illustrate has three substantially radial fingers, each of which is provided with a hole 75 (see Figure 5) to fit loosely over one of the sleeves 38. Each finger is also of curved or warped configuration, as shown most clearly in Figure 5, so that its free end is engageable by a corresponding cam 76. Where the element 74 has three cam-following fingers a corresponding number of cams 76 are provided. The cams 76 consist of suitably shaped plates carried on the interior of the housing 77. This housing is cup-shaped. At its center, it is provided with an aperture which fits snugly over the sleeve 67. At its periphery, the housing 77 is provided with a rim 78 which fits snugly over the peripheral edge of the disk 21. At stragetic intervals around the circumference of the rim 78, slots 79 are provided, as shown most clearly in Figure 1. Each slot fits over a projecting pin 80 carried by the disk 21. Accordingly, the housing 77 may be rotated through slight distances limited by the engagement of the opposite ends of each slot 79 with the corresponding pin 80. The cams 76 are so shaped that when the housing is rotated in one direction these cams will bear against the plate 74 and press it toward the disk 21; and when the housing 77 is rotated in the opposite direction, the plate 74 is permitted to return to its normal position. The latter movement is effected by means of springs 81, there being one such spring on each of the posts 38, as shown most clearly in Figure 3.

Obviously, when the plate 74 is moved toward the disk 21 (against the action of the springs 81) the clutch element 72 is shifted to effect engagement with the spool; and when the plate 74 is retracted by the action of the springs 81, a corresponding disengagement is effected.

Accordingly, as a result of this design and arrangement of parts, the mechanism of the reel is efficiently enclosed at all times, and the ingress of sand or other foreign matter is practically impossible. Thus, while it is unlikely that sand will enter the space between the disk 21 and the spool end 27, any such matter is nevertheless prevented from encountering the mechanism since the disk 21 constitutes a substantial barrier at this side of the mechanism. At the opposite side, the snug passage of the sleeve 67 through the housing base assures complete protection at this side of the mechanism. And the peripheral wall is sealed throughout its extent, except for the slots 79, and since these slots do not give access to the interior of the housing, there is no danger of contamination along this surface. At the same time, the refined and usual adjustments are all available to the user. The spool can be engaged or disengaged from the handle control by slight rotative movements of the housing; and during periods of engagement a slippage is provided for by the "star drag" in usual fashion.

Other advantages of the structure lie in the fact that it is unusually compact, attractive in appearance, and capable of providing for a highly desirable gear ratio between the handle movements and the spool rotation.

In general, it will be understood that many of the details herein described and illustrated are purely illustrative and that those skilled in the art may readily make changes in some or all of these details without necessarily departing from the spirit and scope of the invention as expressed in the appended claims.

Having thus described my invention and illustrated its use, what I claim as new and desire to secure by Letters Patent is:

1. In a fishing reel, a spool, a holder comprising spaced parallel disks between which the spool is journaled, a crank handle, transmission mechanism between said handle and spool and located substantially in its entirety on the outside of one of said disks, said mechanism including a clutch for releasable engagement with said spool, a substantially cylindrical housing supported on said disk and enclosing said mechanism, said housing being rotatively shiftable on its axis, and means controlled by the shifting of said housing for operating said clutch.

2. In a fishing reel, a spool, a holder comprising spaced parallel disks between which the spool is journaled, a crank handle, transmission mechanism between said handle and spool and located substantially in its entirety on the outside of one of said disks, said mechanism including a clutch for releasable engagement with said spool, a housing shiftably supported on said disk and enclosing said mechanism, and means controlled by the shifting of said housing for operating said clutch, said means comprising a cam carried by said housing, and a cam follower operatively engaging said clutch.

3. In a fishing reel, a spool, a holder comprising spaced parallel disks between which the spool is journaled, a crank handle, transmission mechanism between said handle and spool and located substantially in its entirety on the outside of one of said disks, said mechanism including a clutch for releasable engagement with said spool, a housing shiftably supported on said disk and enclosing said mechanism, and means controlled by the shifting of said housing for operating said clutch, said means comprising a reciprocable element operatively engaging said clutch, a spring constantly urging said element in one direction, and a cam carried by said housing and adapted to move said element against the action of said spring.

4. In a fishing reel, a spool, a holder comprising spaced parallel circular disks between which the spool is journaled, a crank handle, transmission mechanism between said handle and spool and located substantially in its entirety on the outside of one of said disks, said mechanism including a clutch for releasable engagement with said spool, a circular housing enclosing said mechanism and concentrically supported on said disk in a manner which permits rotative shifting movements thereof, and means controlled by the shifting of said housing for operating said clutch.

5. In a fishing reel, a spool, a holder comprising spaced parallel circular disks between which the spool is journaled, a crank handle, transmission mechanism between said handle and spool and located substantially in its entirety on the outside of one of said disks, said mechanism including a clutch for releasable engagement with said spool, a circular housing enclosing said mechanism and concentrically supported on said disk in a manner which permits rotative shifting movements thereof, and means controlled by the shifting of said housing for operating said clutch, said means comprising a plurality of circumferentially-spaced cams carried by said housing, and an element operatively engaging said clutch and provided with cam follower portions encounterable by said cams respectively.

6. In a fishing reel, a spool, a holder comprising spaced parallel disks between which the spool is journaled, one of said disks having a central circular aperture therethrough and said spool being provided at one end with a spindle aligned with said aperture, a crank handle, transmission mechanism between said handle and spool and located substantially in its entirety on the outside of said apertured disk, said mechanism including a shiftable clutch element having a part which projects through said aperture to engage and disengage with said spindle, and a clutch control in the form of a housing supported on said disk and enclosing said mechanism.

7. In a fishing reel, a spool, a holder comprising spaced parallel disks between which the spool is journaled, one of said disks having a central circular aperture therethrough and said spool being provided at one end with a spindle aligned with said aperture, a crank handle, transmission mechanism between said handle and spool and located substantially in its entirety on the outside of said apertured disk, said transmission mechanism comprising a driving element carried by and rotatable with said handle, an internally-toothed ring gear driven by said driving element, a rotatable but axially shiftable clutch element having a part which projects through said aperture to engage and disengage with said spindle, a gear chain operatively interposed between said ring gear and said clutch element, a spring constantly urging said clutch element out of engagement with said spindle, a housing enclosing said mechanism and rotatively shiftably mounted on said disk, and a cam element carried by said housing and adapted, when the housing is shifted, to move said clutch element into engagement with said spindle.

FRANK SCHULZ.

REFERENCES CITED

The following references are of record in the file of this patent:

UNITED STATES PATENTS

| Number | Name | Date |
| --- | --- | --- |
| 522,323 | Freese | July 3, 1894 |
| 1,463,828 | Malleson | Aug. 7, 1923 |
| 1,523,983 | Lauterbach | Jan. 20, 1925 |
| 2,001,521 | Cattley | May 14, 1935 |
| 2,130,581 | Case | Sept. 20, 1938 |

FOREIGN PATENTS

| Number | Country | Date |
| --- | --- | --- |
| 27,417 | Great Britain | of 1902 |